United States Patent [19]

Knoll et al.

[11] 4,363,723

[45] Dec. 14, 1982

[54] MULTIFIELD ELECTROSTATIC SEPARATOR

[75] Inventors: Frank S. Knoll, Jacksonville, Fla.; Joseph B. Taylor, Atlanta, Ga.; Peter J. Hoyles, Jacksonville, Fla.

[73] Assignee: Carpco, Inc., Jacksonville, Fla.

[21] Appl. No.: 257,949

[22] Filed: Apr. 27, 1981

[51] Int. Cl.[3] .......... B01D 35/00

[52] U.S. Cl. .......... 209/128; 55/154

[58] Field of Search .......... 209/127-131, 209/221, 224, 225, 226; 361/225; 204/300 R, 300 EC; 55/154

[56] References Cited

U.S. PATENT DOCUMENTS

| | | | |
|---|---|---|---|
| 223,901 | 1/1880 | Fritz | 209/221 |
| 446,767 | 2/1891 | Buchanan | 209/226 |
| 707,088 | 8/1902 | Dinos | 209/38 |
| 819,093 | 5/1906 | Spelly | 209/128 |
| 859,998 | 7/1907 | Wentworth | 209/128 X |
| 867,744 | 10/1907 | McCabe | 209/216 |
| 1,375,741 | 4/1921 | Sulton | 209/127 C |
| 1,498,911 | 6/1924 | Hatfield | 209/127 B |
| 2,216,254 | 10/1940 | Schweitzer | 209/127 B |
| 2,445,229 | 7/1948 | Masse | 209/127 C |
| 2,839,189 | 6/1958 | Johnson | 209/127 R |
| 2,848,727 | 8/1958 | Johnson | 209/127 R X |
| 3,087,616 | 4/1963 | Pierson | 209/221 |
| 3,197,028 | 7/1965 | Watson | 209/221 |
| 3,694,200 | 9/1972 | Pressman | 430/68 X |

FOREIGN PATENT DOCUMENTS

| | | | |
|---|---|---|---|
| 621088 | 5/1961 | Canada | 209/129 |
| 25195 | of 1912 | United Kingdom | 209/221 |
| 602225 | 7/1976 | U.S.S.R. | 209/127 R |
| 759139 | 8/1980 | U.S.S.R. | 209/127 R |

OTHER PUBLICATIONS

Dielectrophoresis, Cambridge Univ. Press, 1978.

*Primary Examiner*—Bernard Nozick
*Attorney, Agent, or Firm*—Arthur G. Yeager

[57] ABSTRACT

An electrostatic separator for separating or removing materials according to their polarizability which comprises a cylindrical surface having a plurality of closely spaced conductors embedded in an electrical nonconductor with the surface adapted to be rotated about its longitudinal axis in close proximity to the material from which loose particles are to be removed. The cylinder is rotated through successive zones wherein the surface of the cylinder is charged while in close proximity to said material causing the particles to migrate to the surface, then through a zone wherein the surface is oppositely charged so as to repel particles therefrom, and collecting and disposing of the particles removed from the material. This apparatus and method has many applications wherein fibers, dust, contaminants, and the like may be removed from the desired product.

26 Claims, 9 Drawing Figures

FIG. 6
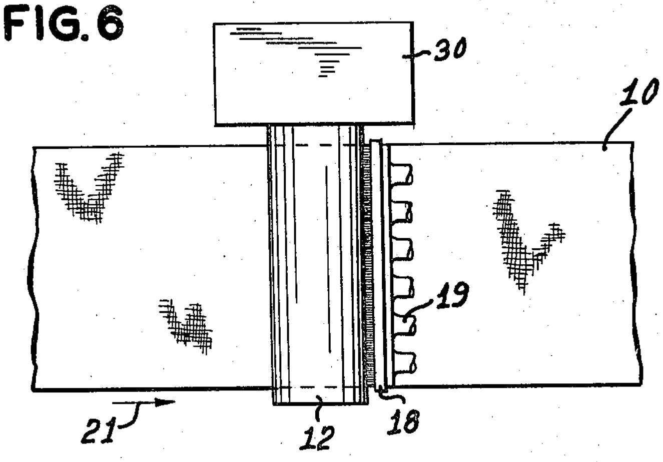
FIG. 7
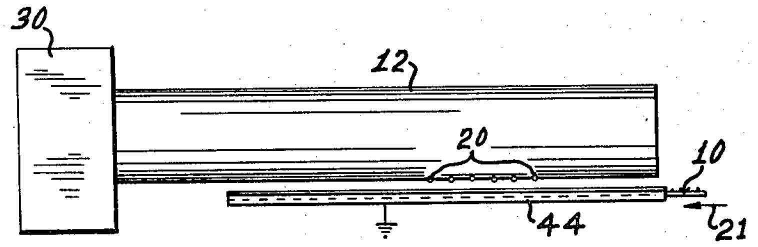
FIG. 8
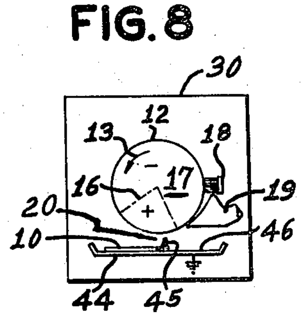
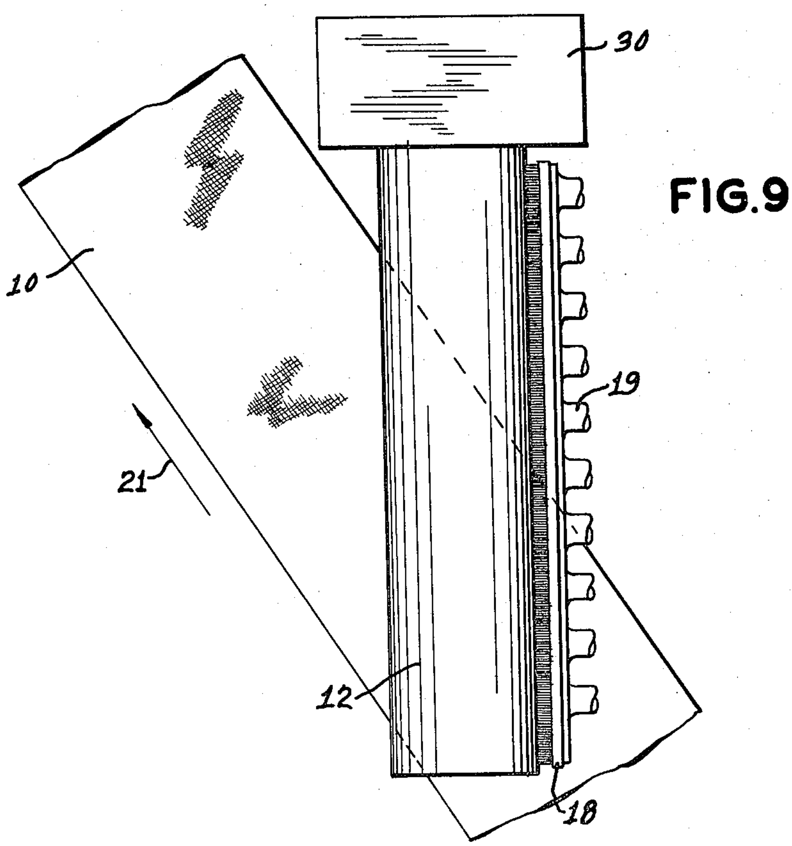
FIG. 9

MULTIFIELD ELECTROSTATIC SEPARATOR

CROSS-REFERENCE TO RELATED APPLICATION

The application entitled Material Separation by Dielectrophoresis, Ser. No. 209,371, filed Nov. 24, 1980 now U.S. Pat. No. 4,305,797, inventors being Frank S. Knoll and Joseph B. Taylor, and assigned to the same assignee, is generally related to the invention described herein.

BACKGROUND OF THE INVENTION

This invention relates to an electrostatic separator and to a method of employing the same wherein the separator produces different electrical fields for attracting and for repelling materials being separated.

It is well known that electrostatic charges may be produced on surfaces and that these charges will be attracted to or will attract other materials having the opposite charge. This principle has been applied in the past to produce apparatus and methods for separating dust particles from a gas stream or from a solid surface and for separating particles having different electric properties. These teachings all involve the separation of charged particles. In the separators of the prior art a drum or a plate is charged and the materials to be separated are placed close to the charged surface permitting the particles that are to be separated to migrate to the charged surface. In another type of separation neutral particles are separated in a non-uniform electric field; for example, the field between a curved surface and a flat surface. In such a nonuniform field the particles are moved toward the more intense portions of the field and in this fashion separation between particles of different dielectric properties can be obtained.

There are many references in the prior art relating to the separation of particles, and an important work in the field is *Dielectrophoresis,* Cambridge University Press, 1978. In such work a detailed treatment of the separation of neutral particles in a non-uniform field can be found, as well as the use of elements or grids to inhibit bunching of such particles. Also, various other methods and apparatus employing such particle separations may be found in U.S. Pat. Nos. 2,317,210—Masse; 4,100,068—Jordan; and 4,226,703—Stout; and British Pat. Nos. 218,354 (1924) and 1,026,438 (1966). None of these prior art references either alone or in any appropriate combination suggest or teach the invention disclosed and claimed herein or in any way to alleviate the inherent problems and deficiencies in such prior art, as will be apparent from a full consideration of this specification.

It is an object of the present invention to provide a multifield separator, i.e. one having multiple charged zones available to assist in the separation. In the multifield separator there are one or more zones where the field is generated by a charge, and another zone or zones where the charge is of the opposite potential. When these zones are employed on the same separator it is possible to achieve an efficient separation by attraction of polarizable particles and then repelling such particles from the surface and cleaning of the surface of any remaining particles which were not repelled off such surface; and all of this accomplished in a single continuous movement. It is therefore an object of this invention to provide a multifield separator which will attract particles at one zone of the separator and repel the same particles at another zone of the separator. Still other objects will appear from the more detailed description of this invention given below.

BRIEF SUMMARY OF THE INVENTION

This invention provides an apparatus for separating or removing particles according to their polarizability which comprises an electrically nonconductive moveable surface having a plurality of closely spaced elongated conductors embedded in the surface generally parallel to the longitudinal axis of the surface; means for moving the surface about an axis or axes means for simultaneously applying a charge to a first portion of the surface and an opposite charge to a second portion of the surface while the surface is moving; means for passing in close proximity to the first portion of the surface a material having polarizable particles thereon to cause the particles to be attracted to the surface; and means for removing the particles from the surface. A specific aspect of this invention includes a commutator which permits the movable surface to receive a charge in one zone, and an opposite charge in a second zone. Another aspect of this invention includes a brush and a vacuum head to remove particles attracted to and clinging to the movable surface.

This invention also provides a method for removing polarizable particles by passing a material having polarizable particles in close proximity to a movable surface, the surface passing successively through a zone where it receives a charge to attract polarizable particles from the material to cause the particles to migrate from the material to the surface, followed by a zone where the surface receives an opposite charge wherein the particles clinging to the surface are repelled or removed therefrom.

BRIEF DESCRIPTION OF THE DRAWINGS

The novel features believed to be characteristic of this invention are set forth with particularity in the appended claims. The invention itself, however, both as to its organization and method of operation together with further objects and advantages thereof, may best be understood by reference to the following description taken in connection with the accompanying drawings in which:

FIG. 6 is a plan view of one system for the use of the apparatus of this invention in removing particles from a continuous strip of material;

FIG. 7 is elevational view of another system of employing the apparatus of this invention in removing articles from a continuously moving strip of material;

FIG. 8 is an end elevational view of the apparatus of FIG. 7; and

FIG. 9 is a plan view of a further system of employing the apparatus of this invention in treating a continuously moving strip of material.

DETAILED DESCRIPTION OF THE PREFERRED EMBODIMENTS OF THE INVENTION

Figure 1:
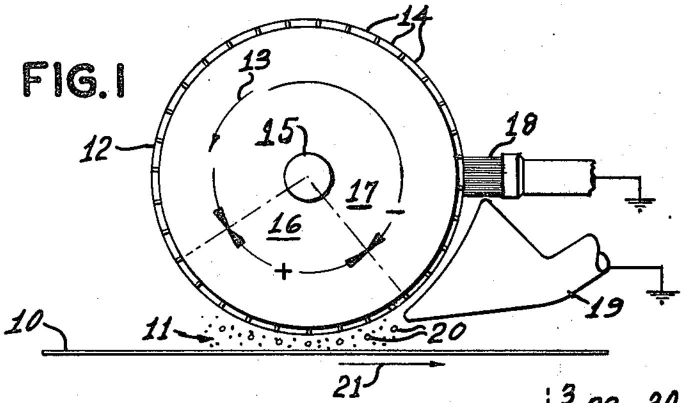
FIG. 1 is a schematic view in elevation of the apparatus of this invention.
Figure 2:
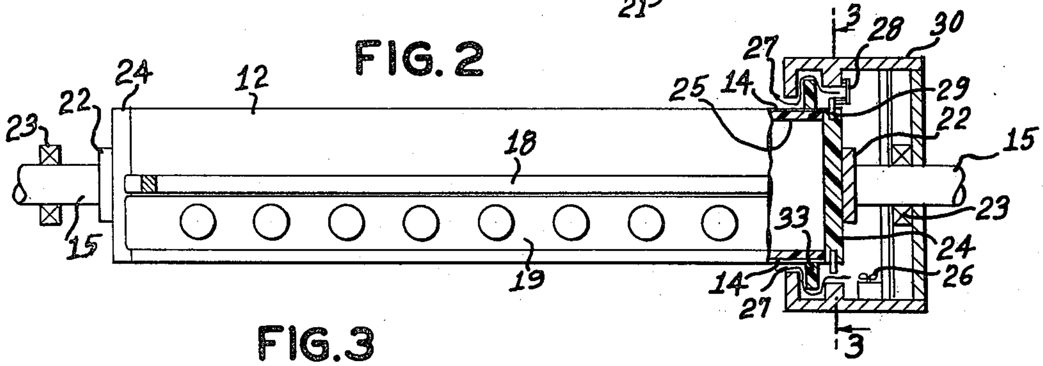
FIG. 2 is a detailed elevational view partly in cross section for clarity of illustration, of the apparatus of this invention.

In FIG. 1 there is shown a schematic illustration of one embodiment of the apparatus and method of this invention. A movable surface herein depicted as a rotating cylinder 12 is placed in close proximity to material 10 having loose particles 11 thereon that are desirably removed from the surface of material 10. For example, material 10 may be a mixture of particles or a continuous length of material from which polarizable particles can be removed; as for example, lint or loose fibers from woven fabric materials. A convenient way of subjecting material 10 to the action of cylinder 12 is to move material 10 continuously in the direction of arrow 21 under cylinder 12 which is rotating about its longitudinal axis in the direction of arrow 13. The surface of cylinder 12 comprises parallel electrical conductors 14 embedded in electrically nonconductive material. Conductors 14 are generally parallel to each other, closely spaced to each other, and generally parallel to the longitudinal axis of cylinder 12. Conductors 14 may be of any shape or size, including rods of any cross sectional shape, wires, tapes, and the like. These conductors may be embedded in the surface of cylinder 12 when that cylinder is being manufactured and thereafter coated with an insulated material which will produce a completely nonporous covering of the conductors and will tightly adhere to the surface of cylinder 12. Cylinder 12 may be made of a plastic sheet material formed into a cylinder, to the outer surface of which a plurality of metallic tapes are applied to function as conductors 14, and thereafter an insulating coating is applied over the tapes 14 to produce a continuous nonporous and smooth surface over the entire outer surface of cylinder 12.

As cylinder 12 rotates in the direction of arrow 13 conductors 14 are provided with a charge when the surface of cylinder 12 is in close proximity to material 10, as shown in the segmented zone 16. As the cylinder 12 continues to rotate the conductors will pass through zone 16 receiving a charge, enter into zone 17 where the charge on the conductors is opposite. In the area of zone 16, particles 11 which are attracted to the surface of cylinder 12, migrate toward that surface and cling to that surface. As those particles pass from zone 16 and 17 the charge is changed to the opposite charge in zone 17 which permits particles 11 to be free of the electrostatic attraction holding them to the surface of cylinder 12 and in fact such opposite charge repels such particles from the surface of cylinder 12. Any particles are also removed by means of vacuum head 19 which is grounded, and therefore has no charge to interfere with the collection of particles 11. In order to do a complete job of cleaning the surface of cylinder 12 of the particles 11 that may remain clinging thereto and not easily removed as they pass from zone 16, into zone 17 where the embedded conductors 14 are oppositely charged, thus causing particles 11 to be repelled from the surface of cylinder 12. To completely remove any remaining particles from the surface, a brush 18, which also is grounded, sweeps the entire surface of cylinder 12 and causes the particles to fall into and be collected by vacuum head 19.

The charge applied in zones 16 and 17 may be direct current (D.C.) or alternating current (A.C.) or modified versions of either or both. Of course when A.C. is applied to zone 16, for example, zone 17 of cylinder 12 is grounded. It has been found that the field generated in zone 16 is made more effective if it is disturbed by the presence of filaments 20. In the aforementioned work *Dielectrophoresis,* beginning on page 38, the "bunching" effect or the clumping or mutual attraction of neutral particles caused by the action or forces of the applied field is described. These filaments can be conductive or non-conductive. Filaments 20 are merely suspended in the space between the surface of cylinder 12 and the surface of material 10 in the form of a grid, net, or a plurality of individual parallel filaments or by any other convenient means.

In FIGS. 2–5 some of the details of constuction of the apparatus of this invention are illustrated. Cylinder 12 may be hollow defined by inner surface 25 and made from a plastic material in cylinder form which is electrically nonconductive, the ends of such cylinder being closed by plastic end caps 24. If caps 24 are made sufficiently heavy the caps may support separate sections of stub shafts 15, or alternatively, shaft 15 may extend continuously along the longitudinal axis of cylinder 12. When stub shafts are employed, it is desirable to include a flange 22 to attach shaft 15 securely by any known means to end cap 24. Shafts 15 are each suspended in appropriate bearings 23 so that cylinder 12 may be freely rotated about its longitudinal axis. Parallel conductors 14 are embedded in the surface of cylinder 12, as previously described and will extend generally from one to the other of end caps 24.

A switching means in the form of a commutator is employed to provide electrical energy to conductors 14 as they pass through zones 16 and 17 as described with respect to FIG. 1. The components of the commutator may include a plurality of upstanding electrical conductors 29 projecting upwardly from one end cap 24. Generally one upstanding member 29 is provided for each conductor 14 and the two are joined by soldering or any other known means to complete the electrically conductive path. Upstanding members 29 rotate with the rotation of cylinder 12 and engage a plurality of stationary electrical brushes 28 that are appropriately affixed to housing 30 so that brushes 28 make electrical contact with upstanding members 29 as cylinder 12 rotates. Brushes 28 are positioned so as to provide the necessary charges in zones 16 and 17 of FIG. 1. The commutator arrangement of members 29, brushes 28, and the associated wiring and power sources (not shown) must be kept free of dust and particles which are attracted to the surface of cylinder 12, so that the electrical functions will not be diminished are otherwise interrupted. For this purpose housing 30 encloses the end of cylinder 12 where the commutator components are located. Housing 30 fits closely around the surface of cylinder 12 and contains fan 26 which is designed to produce a positive air pressure inside of housing 30, with air flow being generally indicated by arrows 27, thus preventing dust and lint particles from entering housing 30. Ring 33 is attached to the outer surface of cylinder 12 and housing 30 is built closely around ring 33.

Figure 3:
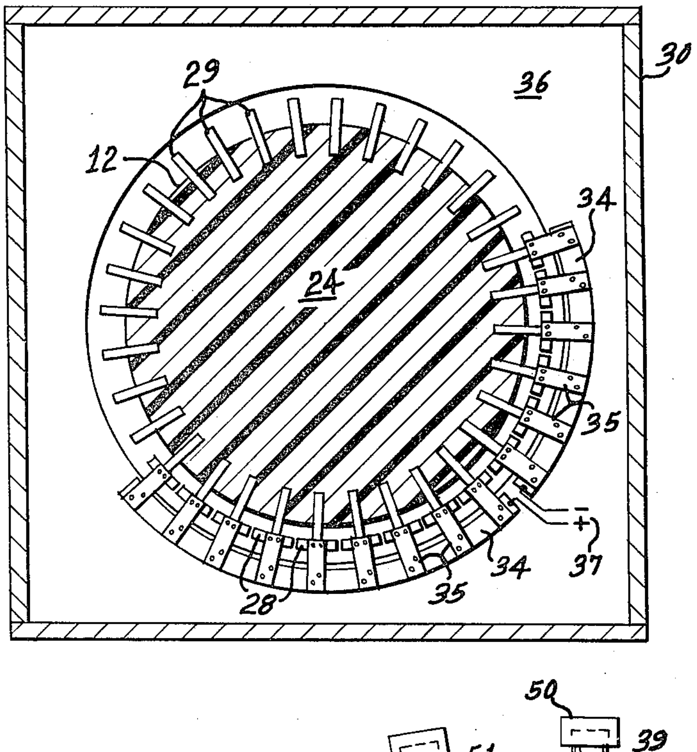
FIG. 3 is a cross-sectional view taken at 3—3 of FIG. 2.
Figure 4:
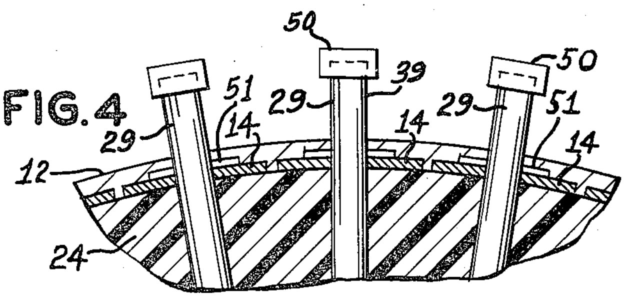
FIG. 4 is an enlarged view of a portion of the cylindrical surface of FIG. 3.

In FIGS. 3 and 4 the details of constuction of the commutator are more clearly shown. The upstanding conductors 29 attached to cylinder 12 are a plurality of equally spaced studs having their shanks embedded in end cap 24 and their heads extending upwardly above surface 12 with insulating covers 50 at their upper extremities. The shanks of members 29 may be fastened to end cap 24 by screw threads, cementing, or any other appropriate means known in the art. Each member 29 is attached to a conductor 14 by a conductive flange 51 or by any means which provides good electrical contact between the metallic tape conductor 14 and member 29. Thus, any electrical energy received by member 29 will be conducted directly to tape 14 attached to that member 29 as to provide a charge to the surface of cylinder 12. Brushes 28 are grouped to provide whatever area desired for zones 16 and 17 (as shown in FIG. 1.). In FIG. 3 a common conductor bar 34 is attached to partition 36 of housing 30 and the brushes 28 are attached to conductor bar 34 through connecting links 35 in the form of spring fingers which bias, the brushes 28 toward members 29. Brushes 28 may be carbon brushes of the type commonly used or any other known type. In the illustration depicted, the brushes 28 that will provide the charge, positive as shown in FIG. 1, on the conductors 14 in zone 16 comprise a series of nine brushes 28 and their associated connecting links 35 attached to a single common conductor bar 34 which receives a positive or negative charge from a power source 37. Similarly the opposite negative or positive charge for zone 17 is shown as comprising six brushes and their associated connector links 35 to a second conductor bar 34 which receives the opposite negative or positive charge from power source 37.

An enlarged view of a small portion of the surface of cylinder 12 at the commutator end is shown in FIG. 4. To cylinder end cap 24 there has been adhesively attached spaced parallel metallic tapes 14 over which has been applied an insulating coating. Each of upstanding members 29 is shown as including a shank portion 39 the upper extremity of which is capped by cover 50 with shank portion 39 being embedded in cylinder end cap 24. A conductive flange 51 insures an appropriate conductive path between shank portion 39 and tape 14.

Figure 5:
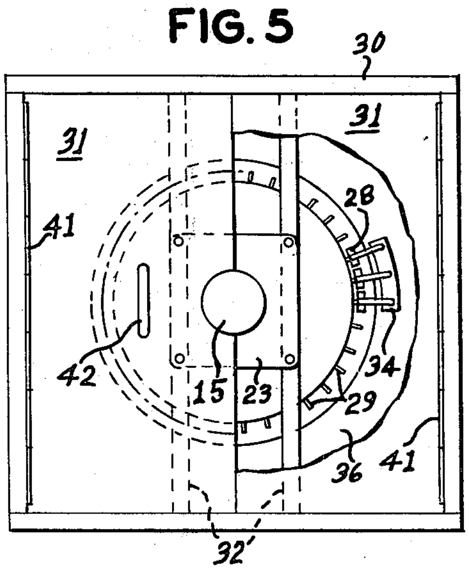
FIG. 5 is an end elevational view of the apparatus shown in FIG. 2.

FIG. 5 depicts the end view of housing 30 in which two doors 31 are respectively hinged at 41 and include handles 42 with cut out portions to accomodate shaft 15 so that each door may be swung open to gain full access to the commutator portion of the apparatus. Also the general arrangement of mounting bearing 23 is shown to support shaft 15 by the use of two support members 32 to which the base of bearing 23 can be attached by bolts or the like.

In FIGS. 6–9 there are shown alternative arrangements for employing the apparatus in accord with this invention. In FIG. 6 cylinder 12 is shown in plan view projecting outwardly from housing 30, which contains the commutator portion and laterally of belt or material 10. Brush 18 and vacuum head 19 are shown in position to remove particles from the surface of cylinder 12. A continuous strip of material 10 is passed in the direction of arrow 21 under cylinder 12 rotating in a direction opposite to arrow 21 as shown by arrow 13 of FIG. 1 and of differently polarizable particles or similarly polarizable materials wherein loose particles like lint or fibers, are removed as material 10 passes beneath cylinder 12.

In FIGS. 7 and 8 the arrangement has been altered so that material 10 passes in a direction parallel to the longitudinal axis of cylinder 12 rather than perpendicular to it as shown in FIGS. and 6. In the FIGS. 7 and 8 the material may be passed over a grounded tray 44 after being subjected to the electrostatic treatment of cylinder 12. As seen in FIG. 8 the zones of positive and negative charges are altered to somewhat different locations than those of FIG. 1. Tray 44 is provided with a divider 45 so that the material to be treated is passed for example, on the left hand portion of the tray and the particles removed from material 10 are dropped into the right hand portion 46 of the tray. If desired, cylinder 12 may also be provided with a brush 18 and vacuum head 19 to substantially completely clean cylinder 12 of any particles clinging thereto which were not repelled from the cylinder 12 and deposited in tray portion 46.

Another arrangement is shown in FIG. 9 wherein material 10 is passed at an acute angle to the axis of cylinder 12 rather than either of the two positions shown in FIGS. 1 and 6 or FIGS. 7 and 8. In certain applications, it may be desirable to use one of the arrangements of FIG. 6, or FIG. 7 or FIG. 8 and the various reasons therefor have not been fully identified or evaluated, particularly since many variables will required a full investigation, study and a determination of which arrangement would be best suited for each application.

The insulating coating applied to the cylindrical surface may be up to about one-half inch in thickness which depends on a number of factors including the separating charges being impressed on or applied on the conductors or tapes 14 and the breakdown voltage of the insulating coating.

All of the above embodiments specifically show a cylinderical form for the electrically non-conductive surface with spaced elongated conductors embedded therein and it is to be understood that such surface can be an isolated section, i.e., a portion of a cylinder or the like, or continuous, i.e., a belt conveyor type. The surface shape may be cylinderical, conical, elliptical or any other convenient and appropriate geometric shape.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. Apparatus for separating or removing particles according to their polarizability which comprises an electrically nonconductive smooth first surface having a plurality of closely spaced and adjacent elongated conductors embedded beneath said surface and extending generally parallel to each other;

means for continuously moving said first surface from a first zone into a second zone;

means for simultaneously applying a charge to said first surface in said first zone and an opposite charge to said first surface in said second zone while said first surface is moving;

means for passing in close proximity to and beneath said first zone particles on a second surface to be separated or removed from said second surface for causing the more polarizable particles to be attracted to said first surface; and said more polarizable particles being repelled by and from said first surface when said first surface moves adjacent said oppositely charged second zone and means for collecting said polarizable particles.

2. Apparatus of claim 1 wherein said first surface as it moves is made to assume successively, positive and negative charges.

3. The apparatus of claim 1 wherein said charges on said first and second zones of said first surface are generated by direct current.

4. The apparatus of claim 1 wherein said charge on said first zone of said first surface is generated by alternating current and said second zone of said surface is grounded.

5. Apparatus of claim 1 further comprising a plurality of filaments interposed between said first zone and said particles to disturb the electric field therebetween and to cause said particles attracted by said first zone to be inhibited from bunching during their movement towards said first zone of said first surface, and means for removing said particles from adjacent said second zone of said first surface.

6. Apparatus of claim 1 wherein said first surface is the surface of a cylinder and said conductors are parallel to the longitudinal axis of said cylinder, said means for moving said first surface rotating said cylinder on said longitudinal axis.

7. Apparatus of claim 1 further comprising means for removing said particles including a stationary brush for sweeping said particles from said first surface.

8. Apparatus of claim 1 further comprising means for removing said particles from said first surface including a vacuum head.

9. Apparatus of claim 1 further comprising a plurality of filaments positioned between said first zone of said first surface and said particles to disturb the electric field and to inhibit from clumping while being attracted to said first zone of said first surface.

10. Apparatus of claim 9 wherein said filaments are electrically conductive.

11. Apparatus of claim 9 wherein said filaments are electrically nonconductive.

12. Apparatus of claim 1 wherein said means for simultaneously applying said charge and opposite charge includes a commutator.

13. Apparatus of claim 12 wherein said commutator comprises a plurality of spaced electrically conductive members located at one end of said first surface, each of said members being electrically conductively joined to at least one of said embedded conductors, said members being spaced away from said first surface and closely spaced from each other, and a plurality of electrically conductive stationary brushes positioned to be in successive contact with said members as said first surface is being moved.

14. Apparatus of claim 13 wherein each of said members is laterally upstanding from said first surface, said members being located in a plane generally perpendicular to said first surface, said brushes being in contact with said members in another plane parallel to said plane.

15. Apparatus of claim 13 having two separate spaced groups of said electrically conductive brushes, one of which receives a positive charge and the other of which receives a negative charge.

16. A method for separating or removing particles according to their polarizability comprising (a) passing said particles to be separated or removed along a path in close proximity to and beneath a first smooth surface having conductive elements mounted thereon;

(b) moving said first surface successively through (1) a first zone where said surface receives a charge and induces a charge on said polarizable particles when in close proximity to said particles to be separated or removed to cause the more polarizable particles to be attracted by and to said first zone of said first surface, and then through (2) a second zone where said surface receives an opposite charge whereby said more polarizable particles on said first surface are repelled therefrom; and (c) collecting said more polarizable particles from said second zone.

17. The method of claim 16 further including (d) brushing off said more polarizable particles which may remain on said first surface.

18. The method of claim 16 further including (d) vacuuming off said more polarizable particles which may remain on said first surface.

19. The method of claim 16 wherein said first surface comprising a plurality of spaced electrical conductors selectively connected to an electrical source during movement of said first surface through said first and second zones.

20. The method of claim 16 further including (d) debunching said more polarizable particles during their attracting movement towards said first surface.

21. The method of claim 16 further including (d) producing said charges on said surface in said first and second zones by direct current.

22. The method of claim 16 further including (d) producing said charge on said surface in said first zone by alternating current and (e) grounding said second zone to discharge any charge on said surface to release said polarizable particles therefrom.

23. The method of claim 16 wherein said first surface is a rotating surface, said surface being defined by an electrically nonconductive smooth surface including a plurality of closely spaced elongated conductors embedded thereunder and extending generally parallel to each other and to the axis of rotation of said surface.

24. The method of claim 16 wherein said first surface moves in the same general direction as said path of said particles.

25. The method of claim 16 wherein said first surface moves laterally of said path of said particles.

26. The method of claim 16 wherein said first surface moves at an acute angle with respect to said path of said particles.

* * * * *